United States Patent
Strang et al.

(10) Patent No.: US 8,322,956 B2
(45) Date of Patent: Dec. 4, 2012

(54) CARGO STOWAGE AND TRANSPORT

(75) Inventors: Robert Andrew Scott Strang, North Melbourne (AU); Robert William Alistair Strang, North Melbourne (AU)

(73) Assignee: Strang LPP Nominees Pty Ltd, North Melbourne, Victoria (AU)

(*) Notice: Subject to any disclaimer, the term of this patent is extended or adjusted under 35 U.S.C. 154(b) by 942 days.

(21) Appl. No.: 11/989,504

(22) PCT Filed: Jul. 27, 2006

(86) PCT No.: PCT/AU2006/001040
§ 371 (c)(1),
(2), (4) Date: Mar. 6, 2009

(87) PCT Pub. No.: WO2007/012115
PCT Pub. Date: Feb. 1, 2007

(65) Prior Publication Data
US 2010/0078429 A1    Apr. 1, 2010

(30) Foreign Application Priority Data
Jul. 27, 2005 (AU) .................... 2005904009

(51) Int. Cl.
*B60P 7/08* (2006.01)
(52) U.S. Cl. ............... 410/49; 410/32; 410/47; 410/42; 410/46; 410/87; 410/155
(58) Field of Classification Search ............ 410/47, 410/32, 87, 42, 46, 36, 39, 49, 50, 88, 117, 410/155, 120; 220/1.5; 206/386, 389, 446, 206/523, 524, 588, 592; 108/55.3, 57.28, 108/901
See application file for complete search history.

(56) References Cited

U.S. PATENT DOCUMENTS

| | | | |
|---|---|---|---|
| 3,747,789 A | 7/1973 | Shipley et al. | |
| 4,195,732 A | 4/1980 | Bell | |
| 4,289,442 A | 9/1981 | Stevens | |
| 4,632,630 A | 12/1986 | Maki et al. | |
| 4,854,792 A * | 8/1989 | Cottone | 410/118 |
| 4,901,870 A | 2/1990 | Wright et al. | |
| 5,743,689 A | 4/1998 | Schlaeger | |
| 6,786,992 B2 | 9/2004 | Dummet | |
| 6,799,926 B1 | 10/2004 | Ross et al. | |

(Continued)

FOREIGN PATENT DOCUMENTS
DE    2 128 073    12/1972
(Continued)

*Primary Examiner* — Stephen Gordon
(74) *Attorney, Agent, or Firm* — Harness, Dickey & Pierce, P.L.C.

(57) ABSTRACT

A method for stowage of cargo items (7, 18, 100). In a cargo container (12, 20, 103) wherein spaces around the cargo items and within the cargo container are at least partly filled with spacer elements (1, 19, 104-106, 109-112) so as to substantially prevent movement of the cargo items in the cargo container, characterized in that dynamic forces on the cargo items associated with motion of the cargo container and/or weight forces on the cargo items are transmitted to the container structure through the spacer elements, and wherein at least one spacer element transmitting such forces comprises a shaped block of expanded plastics foam material, preferably polystyrene. The invention is applicable to comparatively heavy loads such as those transported in shipping containers and in such land vehicles as rail cars and road transport vehicles.

10 Claims, 11 Drawing Sheets

U.S. PATENT DOCUMENTS

| | | |
|---|---|---|
| 7,128,797 B2 | 10/2006 | Dummet |
| 2002/0009345 A1 | 1/2002 | Clive-Smith |
| 2003/0226480 A1 | 12/2003 | Dummet |
| 2005/0023169 A1 | 2/2005 | Parsadayan |
| 2006/0090844 A1 | 5/2006 | Dummet |

FOREIGN PATENT DOCUMENTS

| | | |
|---|---|---|
| DE | 30 20 055 A1 | 4/1982 |
| EP | 0 346 292 A1 | 12/1989 |
| FR | 2 545 468 A1 | 11/1984 |
| GB | 1 350 578 | 4/1974 |
| GB | 1 429 785 | 3/1976 |
| GB | 2 033 871 A | 5/1980 |
| GB | 2 330 820 A | 5/1999 |
| GB | 2 404 366 A | 2/2005 |
| JP | 10-120072 A | 5/1998 |
| JP | 2000-016491 A | 1/2000 |

* cited by examiner

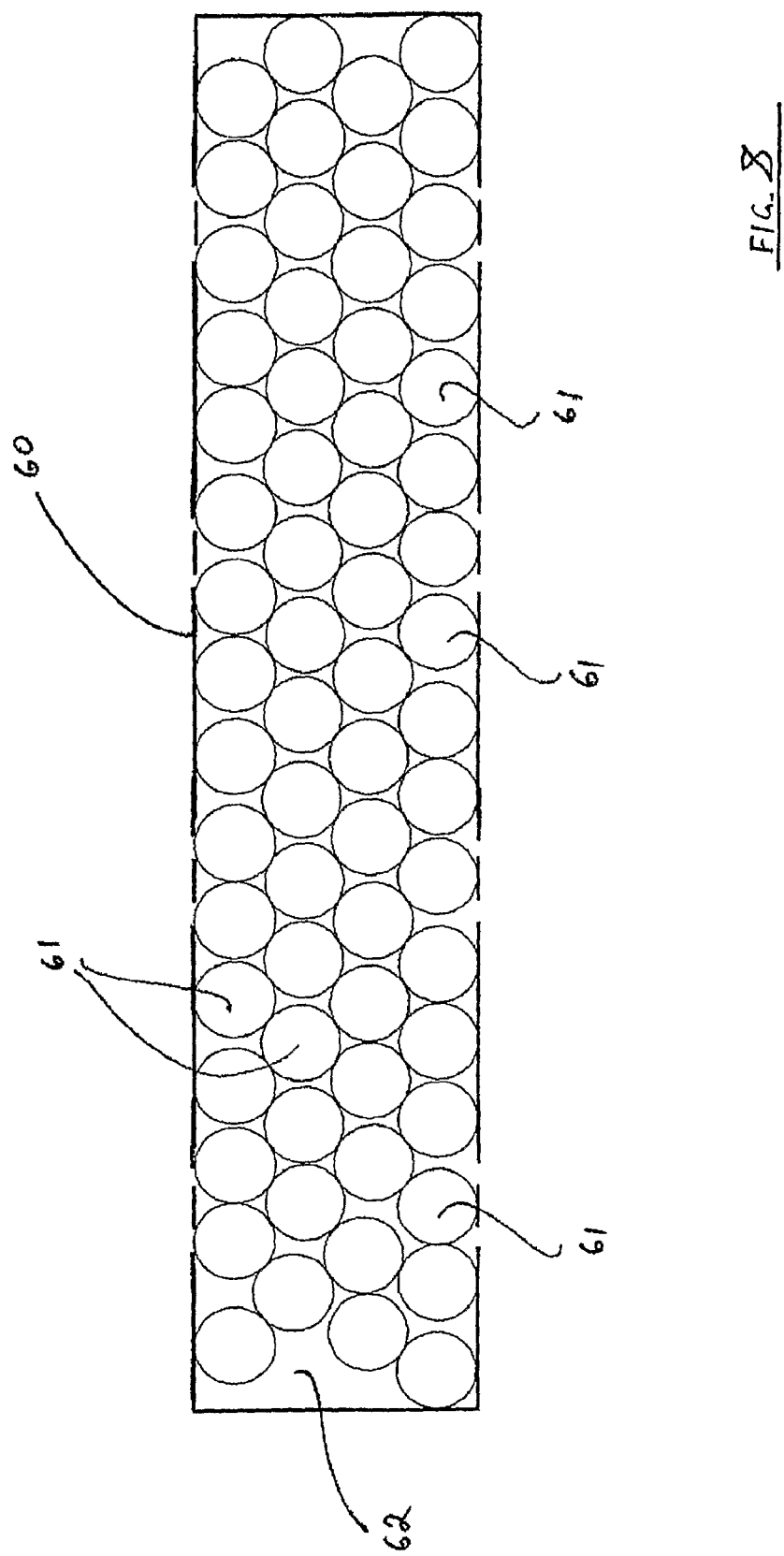

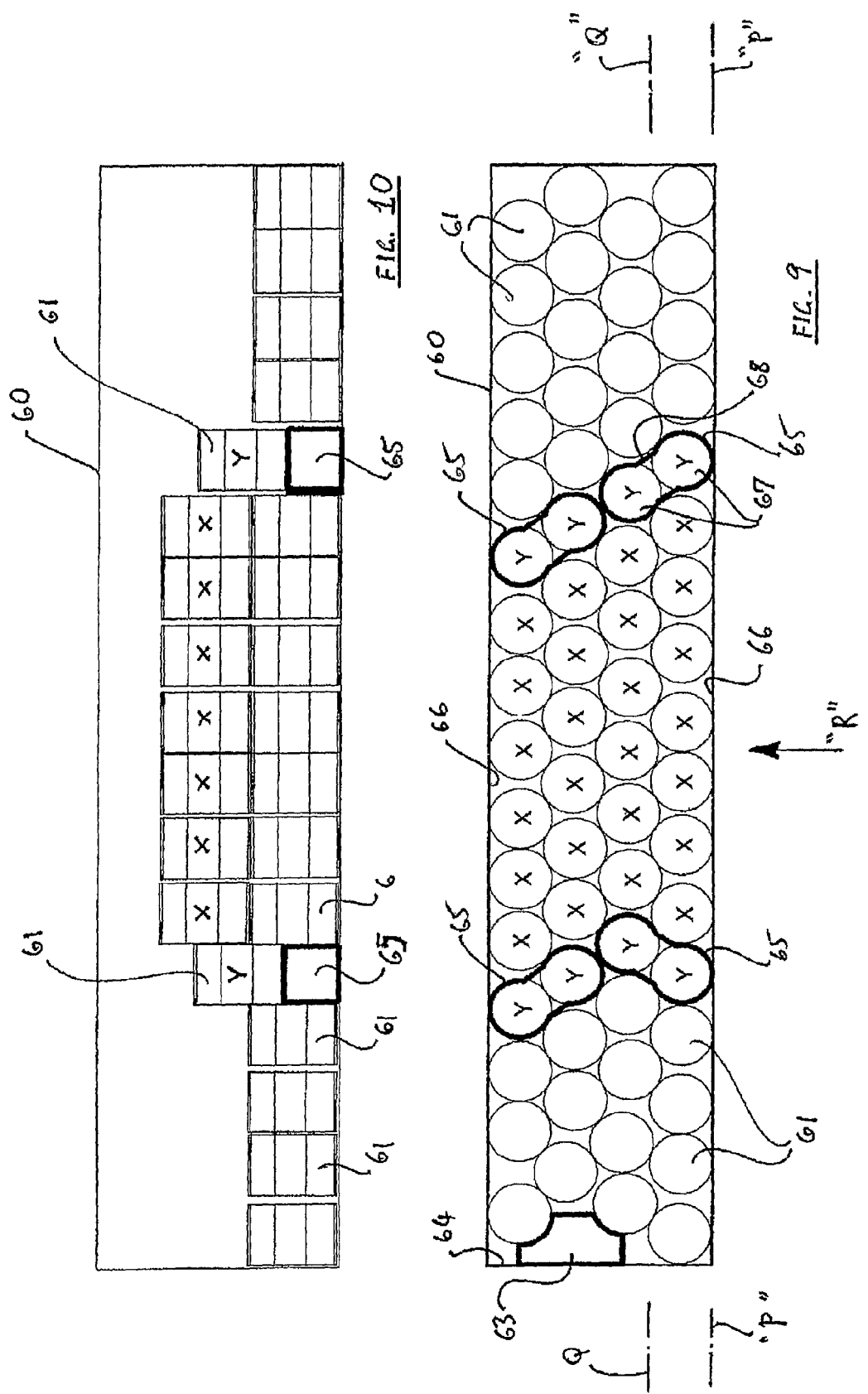

CARGO STOWAGE AND TRANSPORT

CROSS-REFERENCE TO RELATED APPLICATIONS

This application is a U.S. National Stage Application of International Application No. PCT/AU2006/001040, filed on Jul. 27, 2006 and published in English as WO 2007/012115 A1 on Feb. 1, 2007. This application claims the benefit of AU Application No. 2005904009, filed on Jul. 27, 2005. The disclosure(s) of the above applications are incorporated herein by reference.

FIELD OF THE INVENTION

The invention relates to improvements in methods and apparatus for the stowage of goods in containers, especially shipping and other transport containers, and for the transport of goods so stowed.

BACKGROUND

Enormous quantities of goods, including manufactured goods, produce and materials, are daily shipped around the world by land, sea and air in containers of various types. Standard shipping containers as used on seagoing ships, for example, are a familiar sight at sea and on land. The loading of cargo items into such containers and their subsequent unloading, is a major activity involving much expenditure of labour and money. An important problem facing all those involved in shipping of goods is containing the cost of such loading and unloading.

Much of the cost of loading and unloading arises from the need to secure cargo items in their containers securely, to avoid damage in transit. Given the wide variety of goods that must be transported, this can be a skilled process consuming much time and effort.

It is also important in many cases that cargo items not move within their containers during transit. In sea transport, for example, any inadvertent shifting of cargo due to ship motions can have adverse effects on ship stability and hence safety.

Some cargoes comprising multiple discrete items that can be loaded in a container in layers also present a problem in that no number of complete layers closely matches the load carrying capacity of the container, yet partial layers can be difficult to secure against undesired movement.

Materials such as timber used to secure heavy loads in containers can present quarantine and disposal problems at their destinations.

An issue widely recognized in the sea transport industry, at least, is that there can be a mismatch between cargoes and container sizes on particular journey legs. For example, where cargo movements are such that "40-foot" containers arrive at a particular port in numbers greater than are required for cargoes leaving that port, there can be excessive numbers of "dead legs" for such containers, i.e. journey legs where the containers are carried empty. Enhancing the ability of such containers to be loaded with other cargo items could in such a case lead to substantial cost savings by reducing dead legs.

More generally, it is always desirable to enhance the flexibility of loading of containers. For example, making it easier to use a small container where a large one was previously required, or vice versa, allows better matching of cargoes and container availability.

The present invention addresses these problems and issues and is applicable to cargo containers carried on land, sea and air transport vehicles. In addition, it may find application in transport modes where cargo items are contained by the structure of the carrying vehicle, for example where cargo items are carried between decks in ships, or in rail or road vehicles.

SUMMARY OF THE INVENTION

The invention has as its purposes and benefits easier, quicker and cheaper packing and unpacking of shipping and other transport containers, with efficient use of available space and avoidance of movement of cargo items within the container, than is available using conventional packing methods. The surprising finding that certain plastics foam materials can be used for the support and restraint of items of significant weight carried in cargo containers has led to the invention.

In a first aspect, the invention provides a method for stowing a set of cargo items in a cargo container comprising the steps of:

providing a set of one or more substantially rigid spacer elements; and positioning members of said set of spacer elements and members of a set of cargo items in designated positions in a cargo container so that said cargo items and said spacer elements form an assembly that during movement of the cargo container is restrained by contact between the assembly and inner surfaces of said cargo container from movement in a least one direction relative to the cargo container, the method being characterized in that at least one of the spacer elements comprises a shaped block of an expanded plastics foam material.

Preferably, at least one of the spacer elements comprises a shaped block of expanded polystyrene foam.

During movement of the cargo container inertia forces arising in at least one of the cargo items due to the cargo container movement may be transmitted to the cargo container structure through at least one said shaped block.

Further, at least a portion of the weight of at least one of the cargo items may be transmitted to the cargo container structure through at least one said shaped block. Substantially all of the weight of at least one of the cargo items may be transferred to the cargo container structure through shaped blocks of members of the set of spacer elements.

Preferably, a said spacer element is shaped to conform closely to a portion of the shape of a said cargo item. A said spacer element may further comprise reinforcing means secured to a said shaped block and adapted to resist localized crushing of said shaped block.

Thus, in practice of the invention, the substantially rigid spacer elements including expanded plastics foam are intended to actually transmit loads, dynamic and/or static, between the cargo items and the structure of the cargo container. The term "dunnage" is normally used in the art for materials and items which are not firmly attached to cargo and are used to protect the load, so that the spacer elements do not function merely as dunnage. This is despite much teaching away from the use of such materials in the art of transporting substantial loads in cargo containers.

The cargo container may be adapted for movement by an aircraft or define a cargo containing space of an aircraft. In another area of potential application, the cargo container may be adapted for movement by a land vehicle or define a cargo carrying space of a land vehicle. Such a load vehicle could for example be a road vehicle or a rail car.

In particular, the cargo container may be adapted for movement by a seagoing vessel or defines a cargo carrying space of a waterborne vessel. The cargo container comprises a standard shipping container.

The term "standard shipping container" is in this specification to be taken to include in particular containers of the type used in large numbers for transport of goods by sea. The containers in question are the subject of International Standards Organisation (ISO) standards and are available in various sizes, of which common external sizes are:
(a) length: 20 feet (6096 mm); width 8 feet (2438 mm); height 8 feet 6 inches (2591 mm) or 9 feet 6 inches (2896 mm);
(b) length: 40 feet (12192 mm); width 8 feet (2438 mm); height 8 feet 6 inches (2591 mm) or 9 feet inches (2896 mm).

Such shipping containers are of various types and in addition to general purpose containers, the invention is potentially applicable to suitable specific purpose and specific cargo container types, for example refrigerated containers ("reefers"). Containers of this general type are available in a number of other different lengths and the invention may be practiced with such containers.

In one embodiment of the invention, a said spacer element is adapted to be lowered over a said cargo item from above and in use to be retained thereon without substantial relative movement between the spacer element and the cargo item. When said spacer element is lowered over said cargo item a portion of said cargo item is accessible from above. In this embodiment, the said cargo item may be placed directly on a floor of the container or on dunnage on said floor.

In another embodiment of the invention, a spacer element has a lower surface adapted to lie directly on a floor surface of the cargo container or on dunnage on said floor surface and an upper surface shaped to closely conform with a portion of at least one cargo item and to support the at least one cargo item.

In either of these embodiments a spacer element may have upright faces that in use of the spacer element lie closely adjacent to opposing upright inner surfaces of the cargo container. A single spacer element may for example substantially fully span the internal width of a shipping container.

Where cargo item weight is borne by one or more spacer elements, at least one of the spacer elements is positioned within the cargo container and a cargo item is subsequently lowered onto said spacer element. The cargo container may have end doors with said cargo item being loaded through said end doors. Cargo items are placed on spacer elements after the spacer elements have been positioned in the cargo container, it may not be possible for some widely cargo item handling vehicles to position cargo items in the container owing to inadequate reach and inability to enter the cargo container. The method may accommodate this problem by a modification in which while being moved into the cargo container by wheeled support means and said wheeled support means is moved by a separate vehicle so that the separate vehicle can remain outside the cargo container.

The method of the invention can be applied for example (and is advantageous) where a cargo item comprises a coil of strip material, eg steel.

The method of the invention may be applied where the cargo container is a standard shipping container and the or at least one of the cargo items has a weight of more than 10% of a rated payload of the cargo container.

The method of the invention may be applied where the cargo container is a standard shipping container and the or at least one of the cargo items has a weight of more than 20% of a rated payload of the cargo container.

In practice of the method of the invention, the members of the set of cargo items may be maintained in their designated positions in the cargo container by the set of spacer elements substantially without the use of additional restraint means. However, it is not intended to preclude the possible use of restraint means additional to the set of spacer elements.

In one way of practising the method, members of the set of spacer elements but not members of the set of cargo items contact internal upright walls of the cargo container.

In a further aspect, the invention provides a method for transporting a set of cargo items between two locations in a cargo container including the steps of:
at a first location stowing a set of cargo items in a cargo container by a method according to the method disclosed above;
moving the cargo container to a second location and unloading the cargo items and the spacer elements;
disposing of the shaped blocks of the spacer elements by submitting the shaped blocks to a recycling process.

In many destinations where cargo containers are sent, there is existing infrastructure for the recycling of expanded plastics foams, including particularly polystyrene foam, without significant environmental nuisance.

In a further aspect, the invention provides cargo restraining means for restraining movement of cargo items in a cargo container comprising:
a set of one or more substantially rigid spacer elements of which at least one spacer element comprises a shaped block of an expanded plastics foam material; and
said spacer elements being shaped and proportioned so as to positionable with members of a set of cargo items in designated positions in a cargo container so that said cargo items and said spacer elements form an assembly that during movement of the cargo container is restrained by contact between the assembly and inner surfaces of said cargo container from movement in a least one direction relative to the cargo container.

Preferably, the at least one spacer element comprises a shaped block of expanded polystyrene foam.

The cargo restraining means may be adapted for use in a cargo container that is adapted for movement by an aircraft or defines a cargo containing space of an aircraft.

The cargo restraining means may be adapted for use in a cargo container that is adapted for movement by a land vehicle or defines a cargo containing space of a land vehicle.

The cargo restraining means may be adapted for use in a cargo container that is adapted for movement by a seagoing vessel or defines a cargo containing space of a waterborne vessel. In particular, the cargo restraining means may be adapted for use in a standard shipping container.

A said spacer element of the cargo restraining means is preferably shaped to conform to a portion of the shape of a said cargo item.

A said spacer element may further comprise reinforcing means secured to a said shaped block and adapted to resist localized crushing of said shaped block.

A said spacer element may be adapted to be lowered over a said cargo item from above and in use to be retained thereon without substantial relative movement between the spacer element and the cargo item.

In one aspect of the invention in this aspect, a spacer element has a lower surface adapted to lie directly on a floor surface of the cargo container or on dunnage on said floor surface and an upper surface shaped to closely conform with a portion of at least one cargo item and to support the at least one cargo item.

The invention can be used in the restraint and stowage of loads that are larger than is usual in applications of expanded foam materials and in particular polystyrene foam. For example, the cargo restraining means may be adapted to support from below at least one cargo item with a weight of more than 10% of a rated payload of the cargo container. For further example, the cargo restraining means may be adapted to support from below at least one cargo item with a weight of more than 20% of a rated payload of the cargo container.

In a further aspect of the invention there is provided a method of stowage of cargo items in a cargo container wherein spaces around the cargo items and within the cargo container are at least partly filled with spacer elements so as to substantially prevent movement of the cargo items in the cargo container, characterized in that dynamic forces on the cargo items associated with motion of the cargo container and/or weight forces on the cargo items are transmitted to the container structure through the spacer elements, and wherein at least one spacer element transmitting such forces comprises a shaped block of expanded plastics foam material, preferably polystyrene.

In a still further aspect of the invention, there is provided positioning means for maintaining positions of items of cargo in a container, comprising a set of one or more associated and substantially rigid spacer elements wherein members of said set are positionable in designated positions relative to members of a set of cargo items carried in a container so that during movement of the container said cargo items and said spacer elements in combination are substantially restrained by inner surfaces of said container from movement in a least one direction in and relative to the container.

In yet another aspect of the invention, there is provided a method for stowing a set of cargo items in a container comprising the steps of:
providing a set of one or more associated and substantially rigid spacer elements;
positioning members of said set and a set of cargo items in designated positions in a container so that during movement of the container said cargo items and said spacer elements in combination are substantially restrained by inner surfaces of said container from movement in a least one direction relative to the container away from designated positions therein.

In a further invention, there is provided a method for stowing a set of cargo items in a cargo container comprising the steps of:
providing a set of one or more substantially rigid spacer elements; and
positioning members of said set of spacer elements and members of a set of cargo items in designated positions in a cargo container so that said cargo items and said spacer elements form an assembly that during movement of the cargo container is restrained by contact between the assembly and inner surfaces of said cargo container from movement in a least one direction relative to the cargo container,
the method characterized in that
(a) a first layer of cargo items and spacer elements comprised in the assembly is placed on a floor surface of the cargo container so as to be prevented from horizontal movement within the cargo container by contact with opposing pairs of upright walls of the cargo container;
(b) cargo items are placed atop spacer elements of the first layer so as to be partly raised above the level of other cargo items of the first layer; and
(c) a second layer of cargo items is placed on top of the first layer and restrained from horizontal movement in the cargo container by contact with upright walls of the cargo container and the raised cargo items.

Advantageously, at least one of the spacer elements can comprise a shaped block of an expanded plastics foam material, preferably expanded polystyrene foam.

In a further invention, there is provided apparatus for use in stowing of cargo items in shipping containers, comprising:
elongate means having at a front end means for supporting a cargo item and at a rear end means for connection to a part of a vehicle which can be raised and lowered;
chassis means having ground engaging wheels said chassis means being adapted to support the elongate means at a position between the said front and rear ends.

The chassis means may include means for lifting and lowering said elongate means.

The apparatus may have a counterweight attached to the rear end of the elongate means.

Preferably, the counterweight has openings to receive tines of a forklift vehicle and wherein the counterweight is attached to the elongate means so as to be pivotable relative to the elongate means about both transverse and vertical axes.

It is to be understood in this specification that the term "set" used in respect of a set of spacer elements, can mean one spacer element or a plurality. Similarly and intentionally in this specification, the term "set", used in respect of a set of cargo items, can mean one cargo item or a plurality. It is not intended to imply, where there are several members of either type of set, that all such members need be identical.

The term "cargo item", as used herein, can mean a single element or assembly of elements, or a plurality of elements. Similarly, "cargo item" could mean one or several items secured to or on a support or handling element, such as a crate or a pallet.

The term "standard shipping container" is here to be taken to include in particular containers of the type used in large numbers for transport of goods by sea. The containers in question are the subject of International Standards Organisation (ISO) standards and are available in various sizes, of which common external sizes are:
(a) length: 20 feet (6096 mm); width 8 feet (2438 mm); height 8 feet 6 inches (2591 mm) or 9 feet 6 inches (2896 mm);
(b) length: 40 feet (12192 mm); width 8 feet (2438 mm); height 8 feet 6 inches (2591 mm) or 9 feet 6 inches (2896 mm).

Such shipping containers are of various types and in addition to general purpose containers, the invention is potentially applicable to suitable specific purpose and specific cargo container types, for example refrigerated containers. Containers of this general type are available in a number of other different lengths.

In order that the inventive concepts may be better understood there will now be described, non-limitingly, certain preferred embodiments of the invention by reference to the attached Figures, of which:

FIG. 8 is a plan view of a possible packing arrangement for a layer of cylindrical cargo items in a container;

FIG. 9 is a plan view of a load of cargo items and further spacer elements according to the invention, in the interior of a container (shown in phantom lines);

FIG. 10 is a side view of a part of the load of cargo items and of the spacer elements as shown in FIG. 8, the part shown being the containers between planes marked "P" and "Q" in FIG. 8;

DETAILED DESCRIPTION OF PREFERRED EMBODIMENTS

Figure 1:
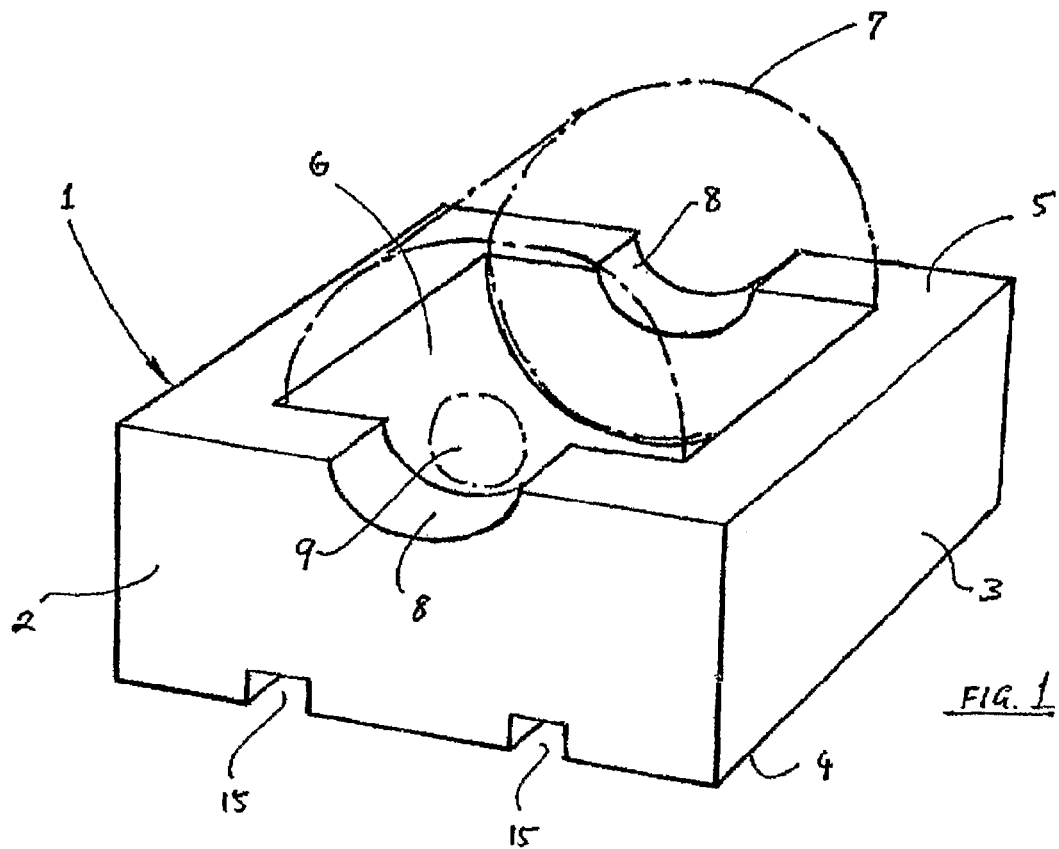
FIG. 1 is a perspective view of a spacer element according to the invention, supporting a coil of steel strip (shown in phantom lines)

FIG. 1 shows a first spacer element 1 according to the invention. Spacer element 1 is generally rectangular, having end faces 2, side faces 3, a bottom face 4 and a top face 5. An upwardly-facing recess 6 has the form of a half-cylinder. Shown in phantom lines in FIG. 1 is a coil 7 of strip steel that is received and supported in recess 6. Coil 7 is an example only of a cargo item able to be supported by a spacer element such as element 1. The use of this example is not intended to limit the scope of the invention or of the types of loads able to be held by spacer elements of the general type exemplified by element 1. Cutouts 8 are provided to provide access to a central hole 9 of coil 7 for an elongate "sting" (not shown) as is typically used by material handling equipment for lifting and moving coils of steel strip. Also, longitudinal recesses 15 extend along the length of bottom face 4 and are spaced and sized to enable tines of a fork lift (or the like, not shown) to lift the spacer element 1 and contained coil 7 together.

Figure 2:
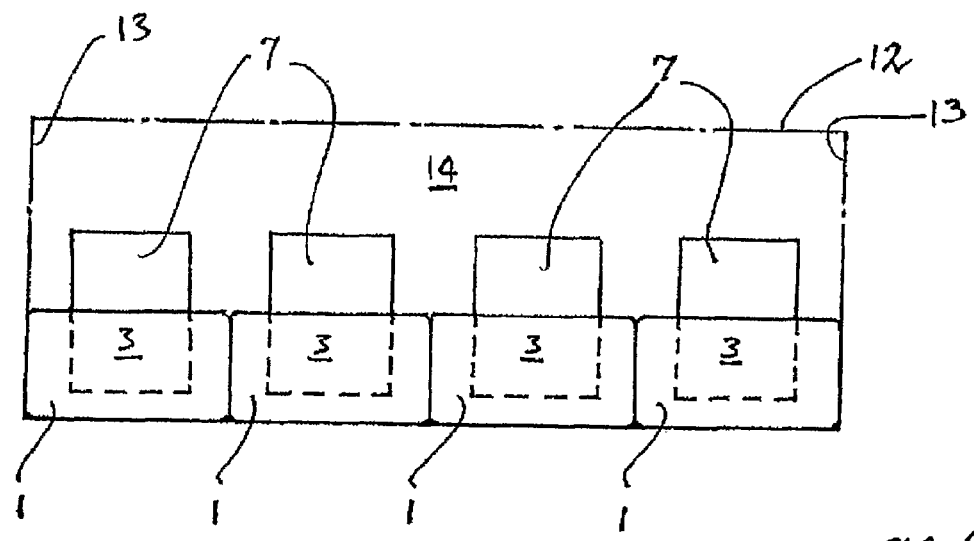
FIG. 2 is a side view of four spacer elements as shown in FIG. 1, in use in the interior of a container (shown in phantom lines)

FIG. 2 shows a side view of four spacer elements 1 and coils 7 positioned in the interior of a standard shipping container 12. Container 12 is represented schematically in FIG. 2 by showing in phantom lines only the edges of its internal surfaces, so that only the container's interior space is shown.

Elements 1 are sized so that four of them snugly fit in container 12, being restrained from longitudinal movement by the inner end surfaces 13 and from lateral movement the inner side surfaces 14 of container 12. Such movements may be caused by ship motions at sea and need to be resisted for ship stability and safety. The width between side faces 3 of element 1 is close tope width between inner side surfaces 14 and the length of the four elements 1 in combination is close to the length between inner end surfaces 13. With this mode of stowing the heavy and unwieldy cargo items 7, it is quicker and easier to load a shipping container and to unload it, with no need for lashing the items 7 to the interior of the container 12 itself.

Spacer elements 1 are preferably formed integrally from a foamed cellular plastics material such as, for example only, "RMAX Geofoam" polystyrene foam, available under the name "Isolite EPS" in Australia from a division of Huntsman Chemical Company Australia Pty Ltd.

This rigid cellular polystyrene material is available in a range of six density classes, with different compressive strengths, and is manufactured to Australian Standard AS1366 Part 3-1992. Grades used by applicants to date are "SL" (nominal density 11 kg/cubic metre and 70 kPa compressive stress at 10% deflection) and "M" (nominal density 19 kg/cubic metre and 105 kPa compressive stress at 10% deformation). However, it is of course desirable in practising the invention, to use a material with a suitable density for the particular application, having regard to the cargo item weights and sizes, likely movements of the container, and the like. Selection does not of itself require inventive effort.

Forming of the elements 1 is preferred to be by foaming in a simple mould (not shown), and more preferably this is done on or close to the site where the coils 7 are to be loaded in container 12. This could be at a steel warehouse or at a container loading facility. Alternatively, the polystyrene foam can simply be purchased in blocks from the manufacturer and cut to shape using suitable known methods (eg hot wire cutting).

Elements 1 may be reinforced—where necessitated by the load to be carried—by providing at appropriate points inserts (not shown) of material(s) more resistant to deformation from concentrated loads than foamed plastics. For example, the recesses 15 could be defined and their surfaces reinforced by inverted channel sections formed from sheet metal placed in the mould before foaming. However, it has surprisingly been found that in many practical cases, and with suitable choice of material, no such reinforcement is needed even for heavy loads.

Other suitable materials may be used, and spacer elements with the functionality of elements 1 may even be fabricated form several components in suitable cases.

The clearances to be provided between the elements 1 and the inner surfaces 13 and 14 of container 12 are chosen by suitable trial (requiring no to inventive activity) to suit the weights of the cargo items involved, the skill of the persons stowing and unloading the containers, and the equipment available to them.

Figure 3:
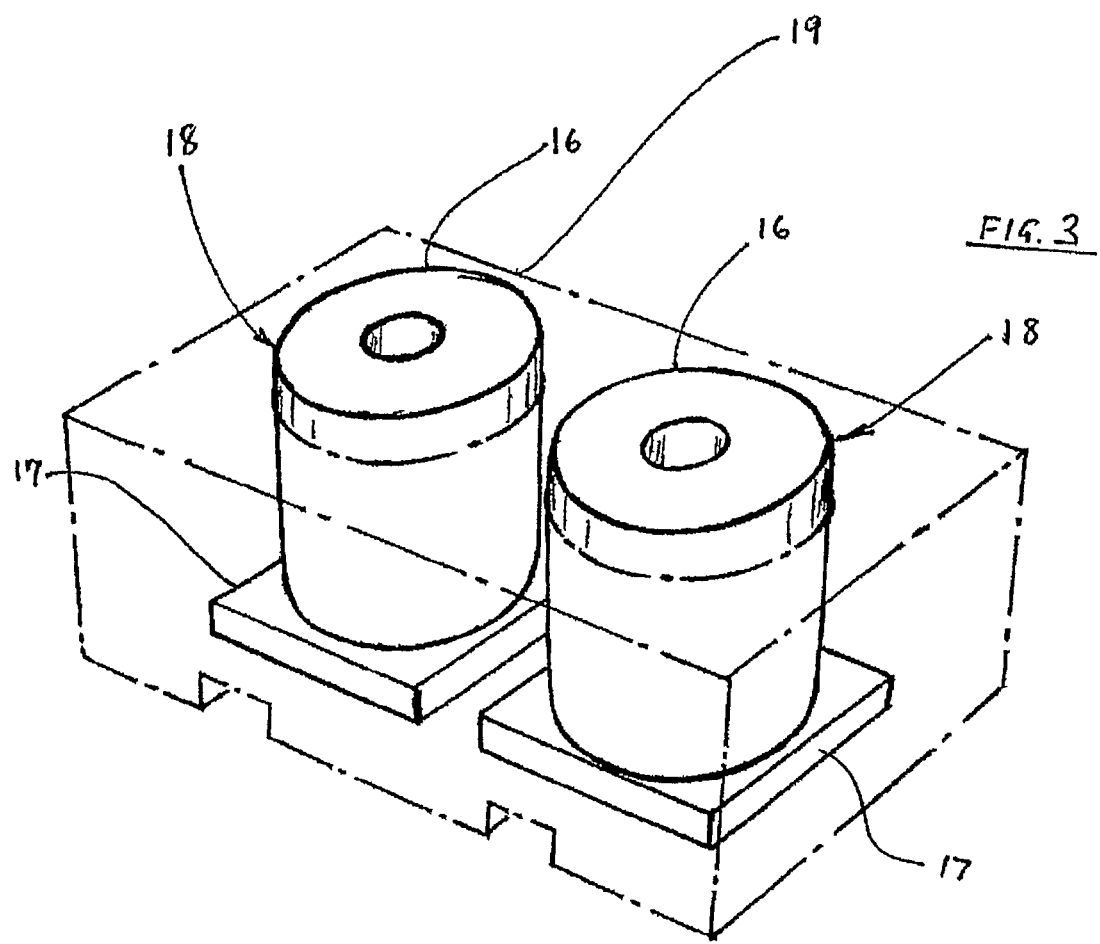
FIG. 3 is a perspective view of two coils of steel strip on pallets and (in phantom lines) a further spacer element according to the invention.

FIG. 3 shows two coils 16 of steel strip, each secured on a suitable pallet 17, each coil 16 and its pallet 17 comprising a cargo item 18. Shown in phantom lines is a further spacer element 19 that can facilitate the stowage of cargo items 18 in shipping containers. Again, no implication of a limitation of the invention to this particular type of cargo item is intended by the use of this illustrative example. Cargo such as cargo items 19 are commonly required to be loaded into shipping containers and are sometimes referred to as "top hats", due to their shape.

Figure 5:
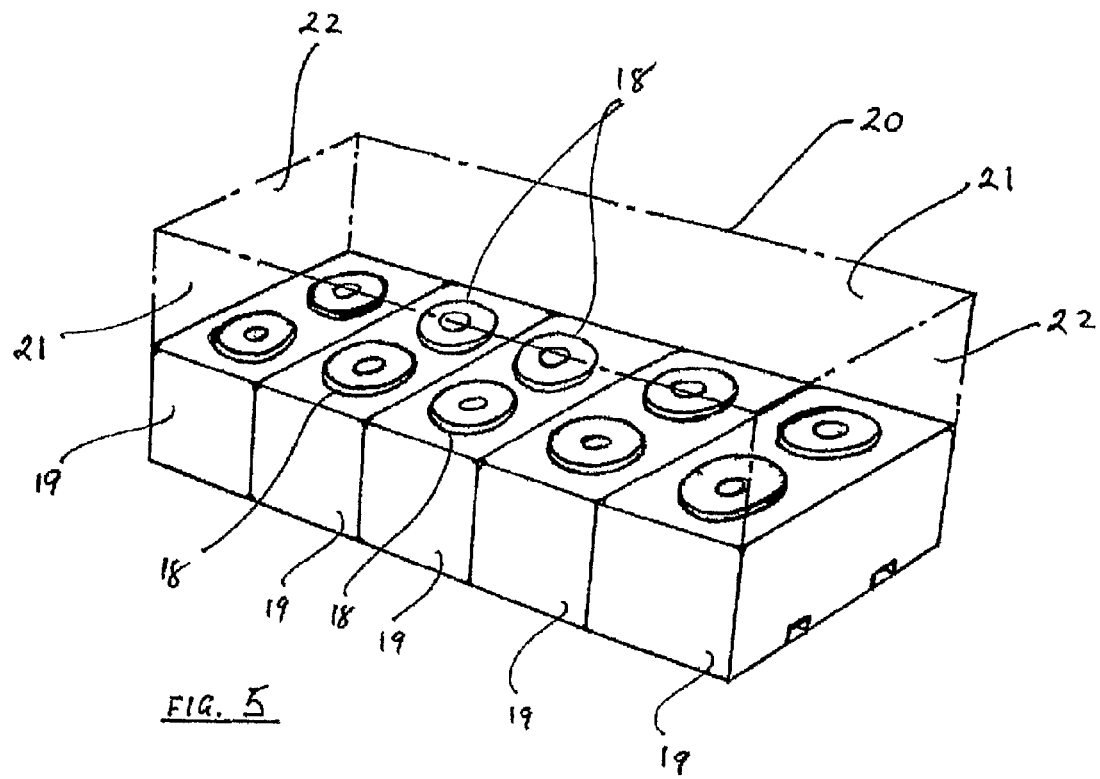
FIG. 5 is a perspective view of five spacer elements and coils as shown in FIG. 3, in use in the interior of a container (shown in phantom lines)

FIG. 5 shows five spacer elements 19 being used to stow ten cargo items 19 in a shipping container interior space 20 (whose edges are shown in phantom lines, just as in FIG. 2). As with spacer elements 1, elements 19 are sized and shaped so as to fit snugly (i.e. with clearances small enough to sufficiently limit load movement wider likely ship motions and large enough for easy loading and unloading) between inner side surfaces 21 of container interior 20 and so that five in combination fit snugly between inner end surfaces 22 of interior 20.

Figure 4:
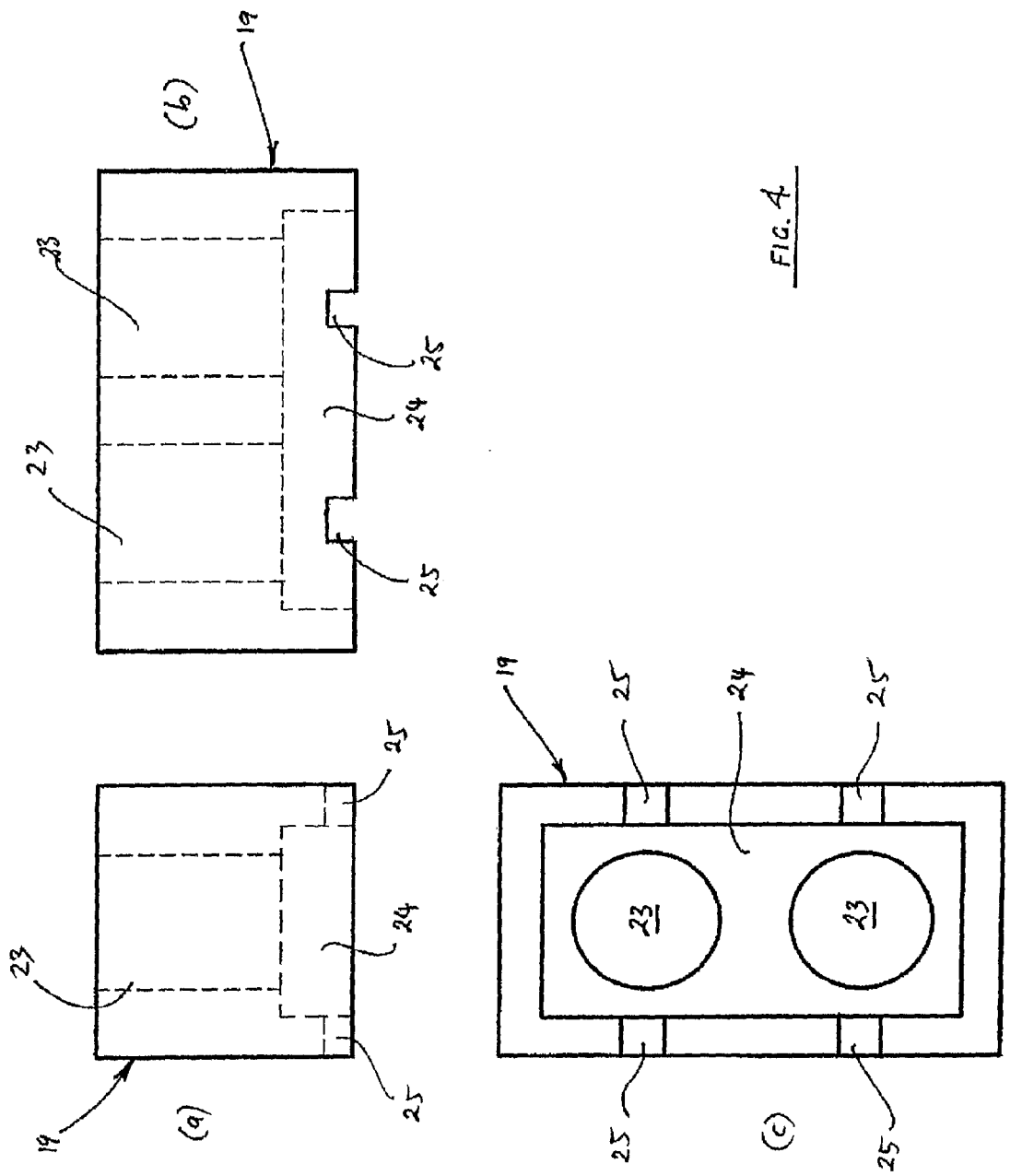
FIG. 4 is a set of three views of the spacer element shown in FIG. 3, namely (a) side elevation, (b) end elevation, (c) view from below.

FIG. 4 shows spacer element 19 in three views. Element 19 is generally in the form of a rectangular prism and has two holes 23 within which coils 16 are received, and a rectangular recess 24 within which pallets 17 are received. In use, and by contrast to spacer element 1 whose load is lowered into recess 6, spacer element 19 is lowered over two cargo items 18 from above and partially surrounds items 18. Spacer element 19 thereafter maintains the desired relative positions of the items 18. A fork lift (not shown) can pass its tines into recesses 25 in the base of element 19 to access pallets 17 and lift the complete combination of items 19 and spacer element 18 for placement into container interior 20.

As with elements 1, spacer elements 19 may conveniently be formed from a lightweight expanded foam plastics material, but without implying any limitation to this material type or construction.

It is not essential that the cargo items 18 protrude through the top of spacer element 19. This arrangement simply happens to economize on the material used to form spacer element 19. A similar spacer element (not shown) could simply cover the items 19 completely (except at the bottom), if required.

Figure 6:
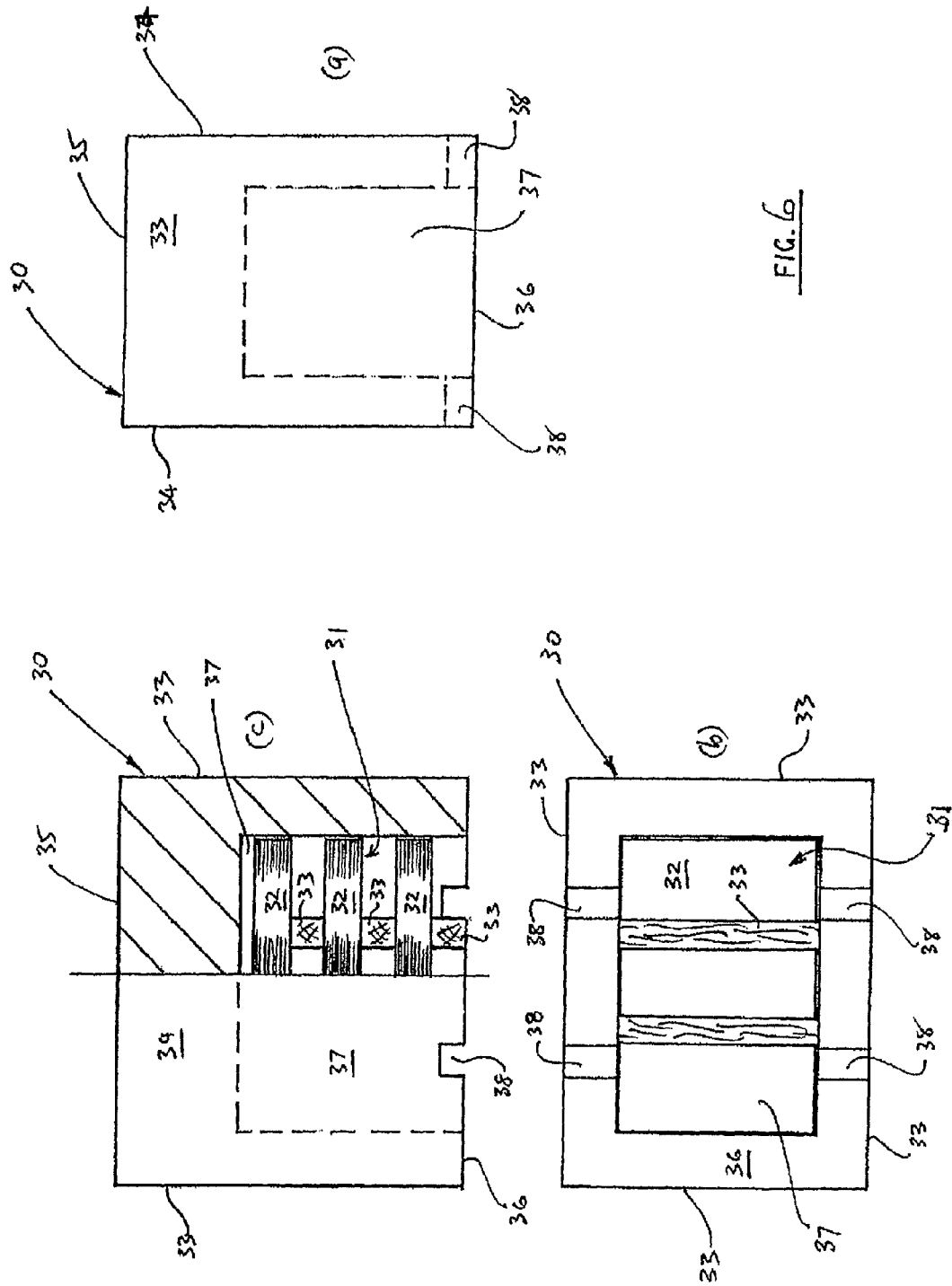
FIG. 6 is a set of three views of a further spacer element according to the invention namely (a) side view, (b) bottom view, and (c) (left half) an end view and (right half) a cross sectional view, the spacer element being shown in views (b) and (c) covering loads of plate material on stillage elements.

FIG. 6 shows a spacer element 30 that is also open-bottomed and in use lowered over a cargo item 31 from above. Cargo item 31 comprises three layers 32 of flat material (eg metal plates or billets for hot rolling) supported on stillage elements 33 in known manner. Spacer element 30 is generally rectangular in overall form, having opposing side faces 33, end faces 34, a top face 35 and a bottom face 36. A recess 37 is formed in bottom face 36 and is shaped and sized for close-fitting containment of cargo item 31 as shown. Recesses 38 are provided also in bottom face 36 for tines of a fork lift or the like, so that once element 30 has been positioned over and lowered onto cargo item 31 the complete combination of spacer element 30 and cargo item 31 can be lifted and conveniently loaded into and unloaded from, a shipping container. The side faces 33 are spaced apart so as to fit between opposing inner side faces of a shipping container (not shown) with clearances small enough to limit undesired movement during transit of the container. Similarly the end faces are spaced so that a specified number of spacer elements 30 can be placed longitudinally in the container with sufficiently small clearance to resist undesired movement in transit.

From the above descriptions of spacer elements 1, 19 and 30, it will be apparent that a very wide variety of cargo items—beyond the specific items used as examples—can be conveniently stowed in containers so as to resist undesired movement therein during transit of the containers. By making the spacer elements at the point of loading, especially by the use of lightweight foamed plastics, an efficient stowing and restraining system can be provided.

Figure 7:
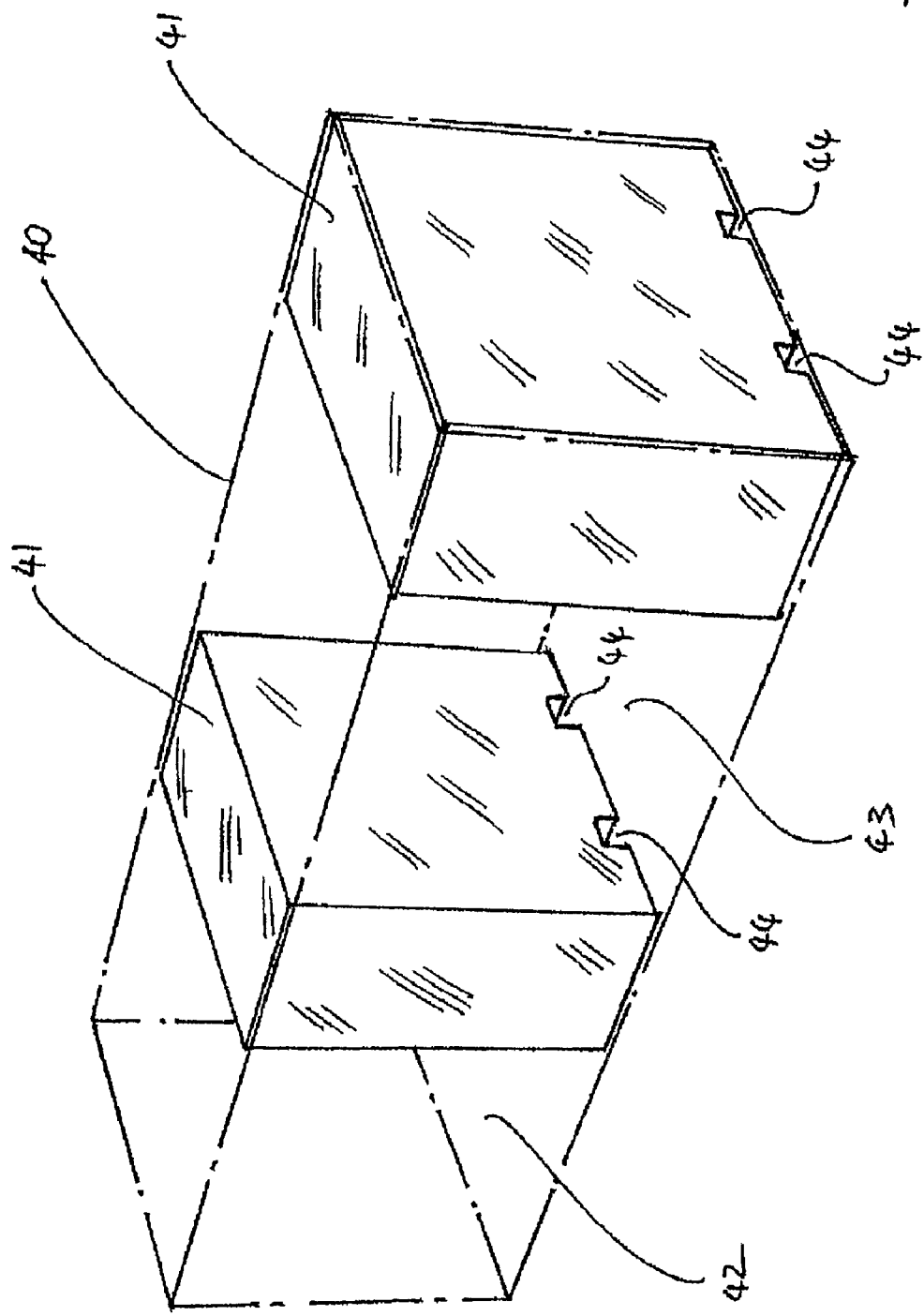
FIG. 7 is a perspective view of two further spacer elements according to the invention in use in the interior of a container (shown in phantom lines)

Elements 1, 19 and 30 all partially surround their respective cargo items 7, 18 and 31 in use. FIG. 7 shows another possibility. A container interior 40 is partially filled with spacer elements 41 so that cargo spaces 42 and 43 are defined by the spacer elements 41 and the interior surfaces of the container interior 40. This arrangement permits cargo items, taking up only part of a container interior to be stowed in such a way that their potential movement in the container is limited by the inner sides, floor and (if desired) roof surfaces and (in the longitudinal direction) by the container inner end surfaces and the spacer elements 41. In this case, the general principle of is again followed of substantially filling gaps between opposing inner surfaces of the container is followed, so as to limit undesired cargo movement, but without actually surrounding the cargo items by the spacer elements 41. Instead cargo items can bear against inner surfaces of the container interior 40.

Spacer elements 41 have recesses 44 for tines of handling equipment to ease the task of location them in the container interior 40.

Spacer elements 41 are shown as solid blocks, but could be provided with openings (not shown) where the nature of the particular cargo items permits to minimize weight and usage of material (such as expanded plastics foam, where used) in the spacer elements 41, to provide for air flow (especially in the case of refrigerated containers), etc.

One possible variation, not shown, is to bevel, round off, or taper upright corner edges of spacer elements (such as elements 1, 19, 30 or 41 for example) to ease the process of passing the elements through load openings (eg doors) in containers. The openings are of course close fitting so that some care in alignment is needed.

Figure 11:
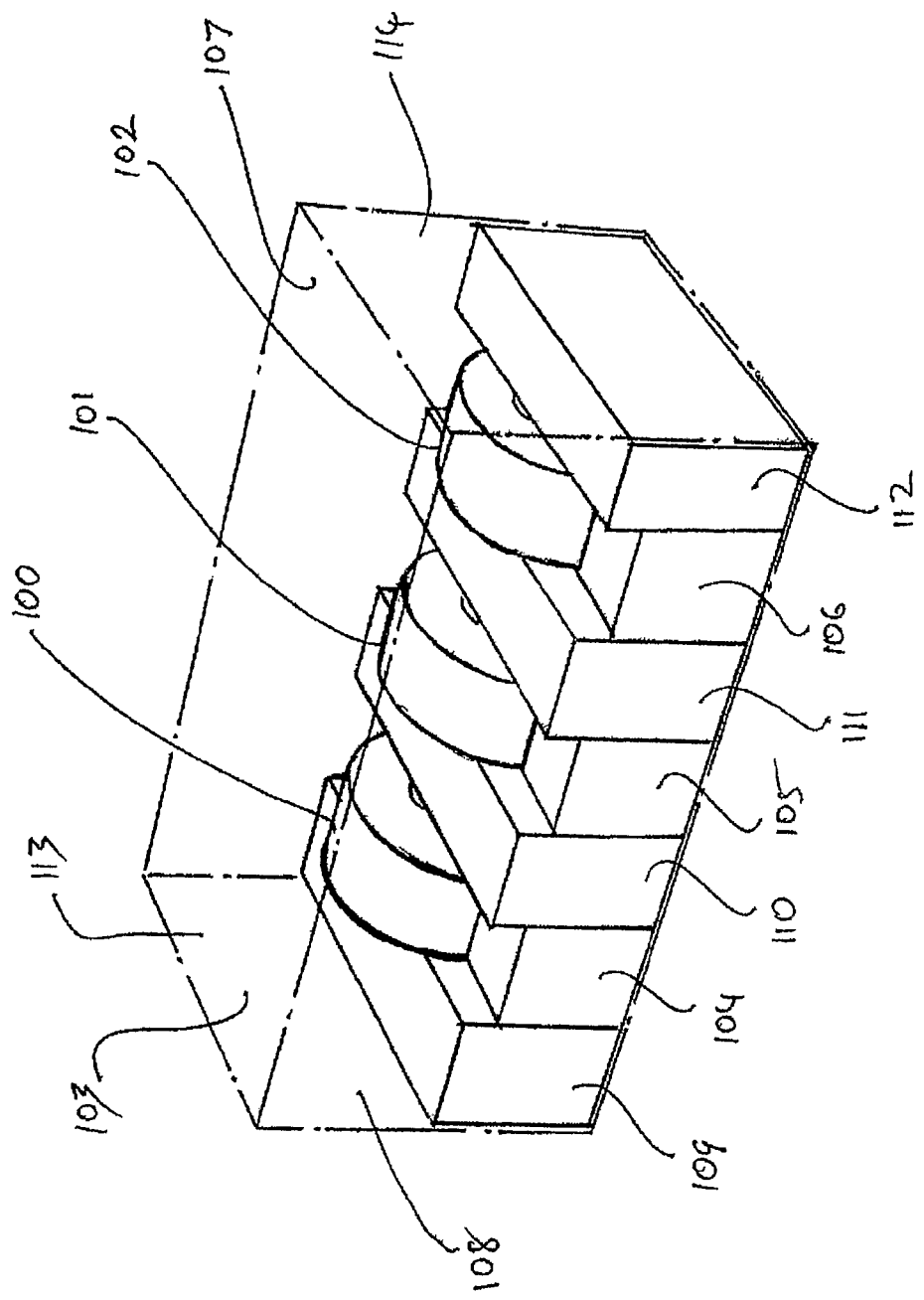
FIG. 11 is a perspective view of a shipping container interior space (represented by phantom lines) with coil-type cargo items stowed therein according to the invention.

FIG. 11 shows three large coils 100, 101 and 102 (eg of steel strip) stowed in a shipping container internal space 103 in another important way of practising the invention. Internal space 103 is represented by chain-dotted lines as before. The coils are stowed with their axes longitudinally oriented in space 103. They are supported from below on spacer elements 104, 105 and 106 which are cut away to closely conform with the cylindrical shapes of coils 100-102 and which closely fit the gap between opposing sidewalls 107 and 108. Four further spacer elements 109, 110, 111 and 112 are provided firstly to separate coils 100 and 101 and 101 and 102 and secondly to separate coils 100 and 102 from respective end walls 113 and 114. The entire assembly of coils 100-102 and spacer elements 109-112 and 104-106 is closely confined between end walls 113 and 114. No separate restraint of coils 100-102 is provided.

Figure 12:
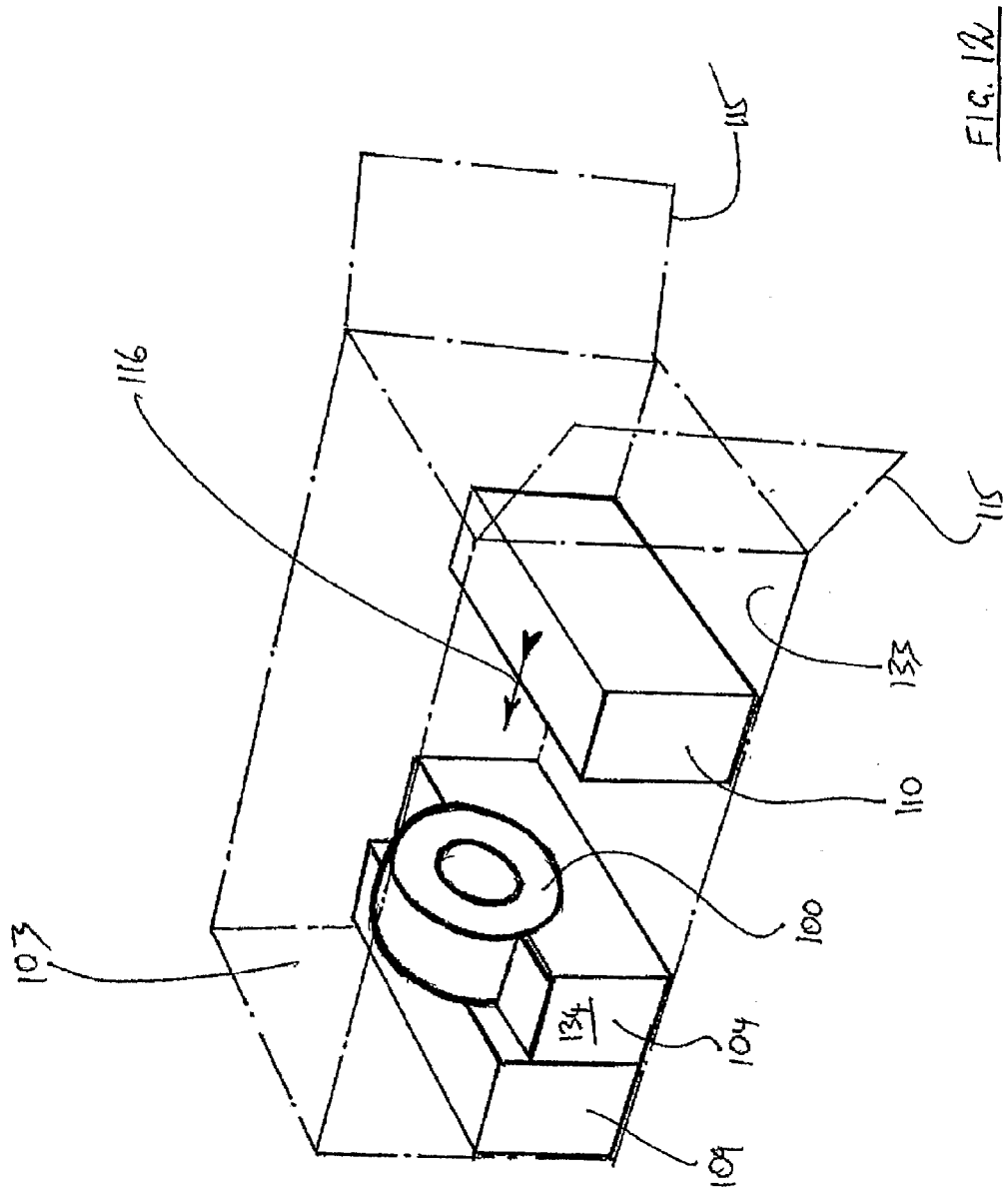
FIG. 12 is a perspective view of the shipping container interior space shown in FIG. 11, now with one only of the three cargo items shown in FIG. 11 in place.

FIG. 12 is a similar view of container internal space 103 partly loaded, through end doors 115. Spacer elements 109 and 104 are in position, and spacer element 110 is being moved longitudinally (as shown by arrow 116) towards its final position. Coil 100 has been placed on spacer element 104, by means described below, after placement of spacer element 104 in position. Similarly, coils 101 and 102 will be placed on their respective supporting spacer elements 105 and 106 In the same way, after placement of elements 105 and 106 in space 103.

Figure 13:
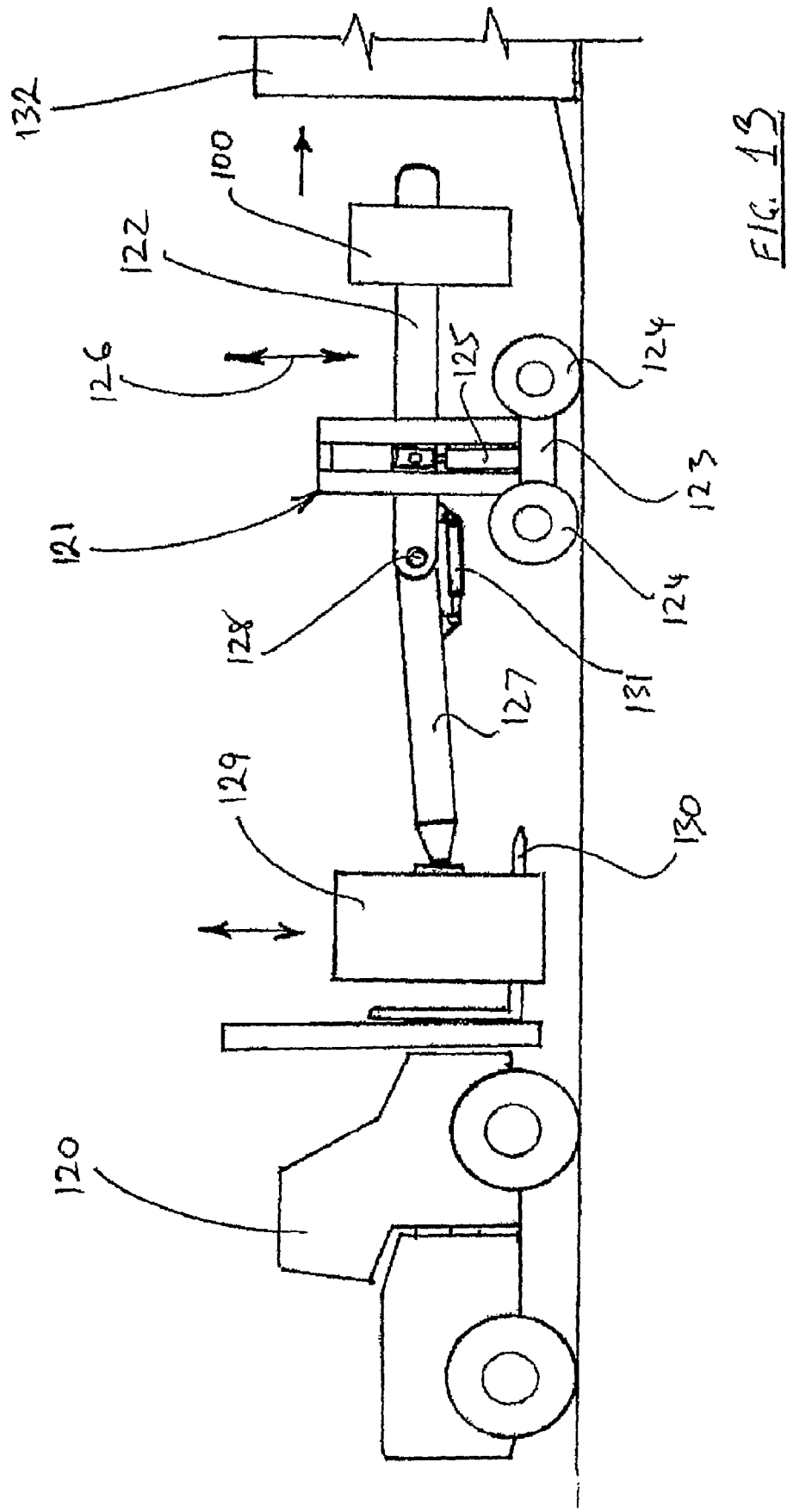
FIG. 13 is a side view of a forklift vehicle, portion of a container and an apparatus for assisting in loading the container.

A difficulty with stowing in the way shown in FIG. 12 is that it can be impossible for a suitably sized fork lift (or other handling device) to enter space 103. FIG. 13 shows a way in which this problem can be overcome. A forklift 120 is used to manoeuvre a wheeled apparatus 121 which has an elongate sting 122 that can pass through coils such as coil 100. A chassis 123 is mounted on wheels 124 and has hydraulic cylinders 125 whereby sling 122 can be raised and lowered (as shown by arrow 126). A beam 127 is mounted at a pivot 128 to sting 122 and is coupled at its opposite (rear) end to a counterweight 129. Coupling of beam 127 to counterweight 129 allows a degree of relative movement between them. Counterweight 129 is adapted to be raised and lowered by forklift 120, which extends its tines 130 into cooperating openings (not shown) in counterweight 129. Hydraulic power for operating cylinders 125 and a cylinder 131 that allows some relative pivoting of beam 127 about sting 122 is taken from forklift 120.

Apparatus 121 can allow heavy weights such as coil 100 to be lifted and manoeuvred into (or out of) a container 132 without itself having to enter container 132. Counterweight 129 reduces the weight to be lifted by forklift 120 when handling coil 100, with wheels 124 acting as a fulcrum. Apparatus 121 allows the use of a forklift smaller than would otherwise be necessary for placement of coil 100 into container 132. This is very helpful, because many dock facilities do not have such large machines. Apparatus 121 can be provided for use only when necessary and allows the use of smaller machines to continue while practising the invention in this way.

Polystyrene spacer elements have the unexpected advantage of surprisingly high friction when in contact with container interior surfaces. Thus, lateral forces on coils 100-102 would be transmitted to the floor 133 of space 103 by shear in spacer elements 104, 105 and 106 and friction at their contacts with floor 133, as well as by direct bearing of end faces such as faces 134 on walls 107 and 108. Generally clearances between spacer elements such as 104-106 and opposing walls such as 107 and 108 should be as small as practicable, even to the extent of actual contact between the elements and the walls on both sides. However, the effect of friction where cargo items such as coils 100-102 are supported from below is to alleviate any ill effects of positive clearances. Clearances can if desired or found necessary be closed by sliding any suitable thin laminar material between spacer elements and walls.

An important point of difference among the various spacer elements described herein is that some are used to resist both the weight of cargo items and lateral forces arising from motions during transport of the cargo container, whereas others resist only the latter type of forces. Spacer elements 1 and 104-106, for example, support the weight of cargo items (respectively items 7 and 100-102) and also restrain movement of those cargo items in generally horizontal directions in their containers, which movements can arise from dynamic forces associated with motion in a seaway for shipping containers or cornering and acceleration loads in land applications. By contrast, spacer elements 19, 34 and 109-112 primarily restrain cargo items against generally horizontal forces, while the weight of the cargo items is taken directly by the floors of their respective containers.

Figure 14:
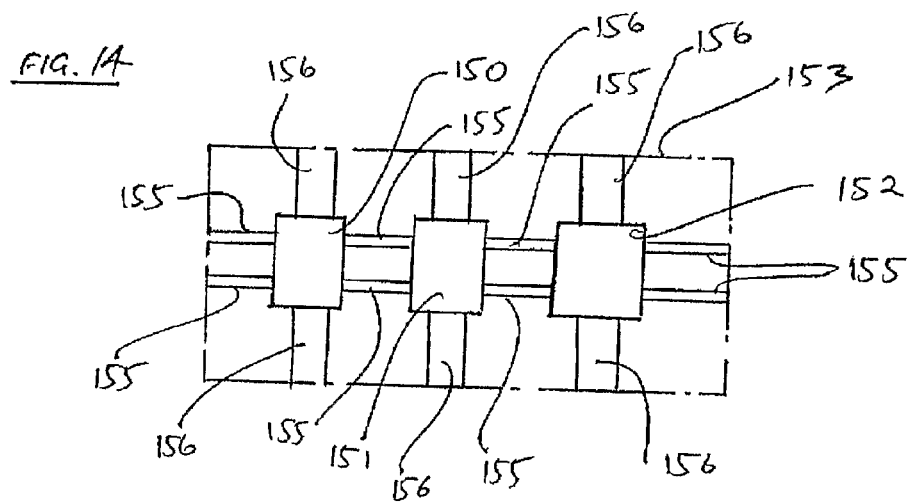
FIG. 14 is a plan view of a container internal space containing three cargo items, shoring timbers and spacer elements arranged in accordance with the invention.

Further, the invention may be used for restraint of loads against horizontal movement in a cargo container in one direction only or in two perpendicular directions. In FIGS. 2, 5 and 11, container spaces 12, 20 and 103 are shown as being completely filled except for space above the loads, so that both lateral and longitudinal movements are resisted by the spacer elements 1, 19 and 104-106 and 109-112. However, it is possible in principle to apply the invention in such a way that only movements in one direction are resisted by the spacer elements including expanded foam materials, with other means being provided to resist movement in a perpendicular direction. In FIG. 14, heavy cargo items 150, 161 and 152 are shown in a container internal space 153 (represented by chain-dotted lines) and are secured against longitudinal movement (i.e. in the direction of arrow 154) by timbers 155. However, they could still move laterally to some degree, and so are restrained against lateral movement by spacer elements 156 according to the invention. Any or all of the cargo items 150-152 could of course have their weight supported by spacer elements according to the invention. FIG. 14 is meant primarily to illustrate the above point rather than necessarily being a practical and preferred way of practising the invention.

Further embodiments and methods of practising the invention, in which the cargo items are not necessarily surrounded, will now be described.

FIG. 8 is a plan view of a container interior 60 (shown in phantom lines) with a single layer of 65 drum-type cargo items 61 therein. A problem of this arrangement is that the layer of items 61 is not constrained sufficiently by the interior surfaces of the container interior 60 to fully prevent movement of items in transit, with the possibility of damage or leakage. There is a space 62 into which cargo items 61 can move, but which cannot be neatly filled by one or more extra containers 61. A further problem that often arises with cargoes of this type is that one layer does not fully utilize the weight carrying capacity of the container, whereas two full layers would exceed that capacity. FIGS. 9 and 10 show how the invention allows these problems to be avoided.

FIG. 9 is a similar view to FIG. 8, showing how the container interior 60 can be stowed with an extra 25 cargo items to make 90 cargo items in all, all constrained against excessive movement during transit. FIG. 10 shows this cargo as seen in side elevation looking in the direction of arrow "R" in FIG. 9, although for clarity only those cargo items between planes "P" and "Q" are shown. To prevent movement within the space 62, a suitably shaped and sized spacer element 63 is positioned therein bearing against some of the cargo items 61 and inner end surface 64. (A spacer element 63, positioned in a designated position as a first step in loading a layer of cargo items 61, has the additional advantage of guiding the building up of the layer with each item in its correct position, so that an intended or designed arrangement and number of items 61 in the layer is achieved.)

In FIG. 9, circles without letters indicate cargo items 61 of the bottom layer. Circles with the letter "Y" indicate cargo items 61 that are raised partly out of the bottom layer by being positioned on top of suitably shaped and sized spacer elements 65, of which four are shown in this case. A partial layer of 25 additional cargo items 61, marked "X", is then stacked on top of items 61 of the bottom layer. Undesired movement of the items 61 labelled "X" is to prevented by the inner side surfaces 66 of container interior 60 and end barriers formed by the partly-raised cargo items 61 labelled "Y".

Each of spacer elements has the form of two cylinders 67 (that each sit under one cargo item 61) joined by an intermediate section 68. However, this is optional. It will be clear to skilled persons that many other shapes would be possible. Another possibility is to provide spacer elements (not shown) that instead of lifting some cargo items partially out of one layer to form a barrier to movement of items in another layer, are held within one layer and also extend out of that layer to form a barrier against undesired movement of items of another layer. For example, elements having a shape that is a combination of the shape of elements 67 and the cargo items 61 shown above them in FIGS. 9 and 10 could be used as an alternative to elements 67 to restrain movement of items 61 of the upper layer.

As with the arrangement of FIG. 7, the arrangement of FIGS. 9 and 10 involves a cargo being constrained against undesired movement by a combination of interior surfaces of a container and by spacer elements placed in the container.

It should be understood that there is nothing specific to the particular packing arrangement shown in FIGS. 8, 9 and 10 that limits the scope of the invention. What has been described is purely an example.

Many variations and enhancements may be made without exceeding the spirit or scope of the invention.

The invention claimed is:

1. A standard 20-foot or 40-foot shipping container containing stowed cargo items, each weighing more than 10% of a rated payload of the container and having a cylindrical shape a central axis of which is orientated longitudinally, and cargo restraining means which comprises substantially rigid supports, the supports comprising shaped blocks of expanded plastics foam and being shaped and proportioned and positioned with the cargo items such that an assembly comprising the cargo items and supports engages inner surfaces of the container to be restrained from movement relative to the container, wherein ones of the supports support the cargo items from below, such that the cargo items are positioned clear of a floor of the container, and closely fit a gap between opposing sidewalls of the container.

2. A shipping container according to claim 1, wherein individual ones of the supports contact internal upright walls of the container.

3. A shipping container according to claim 1, wherein the supports which support the cargo items from below conform to portions of the respective cargo items.

4. A shipping container according to claim 1, wherein each of the cargo items has a weight which is more than 20% of the rated payload.

5. A shipping container according to claim 1, wherein the supports which support the cargo items from below closely conform with said respective cylindrical shapes.

6. A shipping container according to claim 1, wherein the cargo items comprise coils of strip material.

7. A shipping container according to claim 1, wherein the supports which support the cargo items from below each comprise an upwardly facing recess in the form of a half-cylinder which receives a respective one of the cargo items.

8. A shipping container according to claim 1, wherein the assembly contacts said inner surfaces.

9. A shipping container according to claim 1, wherein ones of the supports separate the cargo items from each other and from end walls of the container.

10. A shipping container according to claim 1, wherein the assembly is closely confined between ends walls of the container.

* * * * *